United States Patent
Gillen et al.

(10) Patent No.: US 11,187,322 B2
(45) Date of Patent: Nov. 30, 2021

(54) PISTON RING HAVING A STEPPED RUNNING SURFACE

(71) Applicant: FEDERAL-MOGUL BURSCHEID GMBH, Burscheid (DE)

(72) Inventors: Jurgen Gillen, Leverkusen (DE); Fabian Ruch, Leverkusen (DE); Jorn Propper, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 188 days.

(21) Appl. No.: 16/474,631

(22) PCT Filed: Jan. 4, 2018

(86) PCT No.: PCT/EP2018/050198
§ 371 (c)(1),
(2) Date: Jun. 28, 2019

(87) PCT Pub. No.: WO2018/127534
PCT Pub. Date: Jul. 12, 2018

(65) Prior Publication Data
US 2019/0346043 A1 Nov. 14, 2019

(30) Foreign Application Priority Data

Jan. 5, 2017 (DE) .................... 10 2017 100 173.5

(51) Int. Cl.
| | | |
|---|---|---|
| *F16J 9/08* | (2006.01) | |
| *F16J 9/20* | (2006.01) | |
| *F16J 9/14* | (2006.01) | |
| *F16J 9/26* | (2006.01) | |
| *F16J 9/28* | (2006.01) | |
| *B24B 19/11* | (2006.01) | |

(52) U.S. Cl.
CPC . *F16J 9/08* (2013.01); *F16J 9/20* (2013.01); *B24B 19/11* (2013.01); *F16J 9/14* (2013.01); *F16J 9/26* (2013.01); *F16J 9/28* (2013.01)

(58) Field of Classification Search
CPC . F16J 9/00; F16J 9/08; F16J 9/20; F16J 9/02; F16J 9/06; F16J 9/203; F16J 9/12; F16J 9/14; F16J 9/206; F16J 9/26; F16J 9/28
USPC .......................................................... 277/434
See application file for complete search history.

(56) References Cited

U.S. PATENT DOCUMENTS

| | | | | |
|---|---|---|---|---|
| 2,131,970 A | * | 10/1938 | Ritz ........................... | F16J 9/20 |
| | | | | 277/461 |
| 2,554,289 A | * | 5/1951 | Anderson .................. | F16J 9/20 |
| | | | | 277/444 |
| 3,571,898 A | * | 3/1971 | Fuhrmann .................. | F16J 9/12 |
| | | | | 29/407.06 |

(Continued)

FOREIGN PATENT DOCUMENTS

| | | |
|---|---|---|
| DE | 43 00 531 C1 | 2/1994 |
| DE | 10 2013 205908 A1 | 10/2014 |
| DE | 102015109781 A1 | 12/2016 |

(Continued)

*Primary Examiner* — Nathan Cumar
(74) *Attorney, Agent, or Firm* — Robert L. Stearns; Dickinson Wright, PLLC

(57) ABSTRACT

A stepped piston ring (2) includes a ring outer side (5), an upper ring flank (6), and a lower ring flank (8). The ring outer side (5) on the upper edge has a notch (10, so that only a lower portion of the ring outer side (5) forms a contact surface (4).

18 Claims, 3 Drawing Sheets

(56) References Cited

U.S. PATENT DOCUMENTS 4,040,637 A * 8/1977 McCormick ............... F16J 9/20
                                                    277/460
8,371,585 B2 * 2/2013 Esser ....................... F16J 9/062
                                                    277/434

FOREIGN PATENT DOCUMENTS

| EP | 3056775 A1 | 8/2016 |
| WO | WO 2014/072115 A1 | 5/2014 |
| WO | WO2016/136202 A1 | 9/2016 |

* cited by examiner

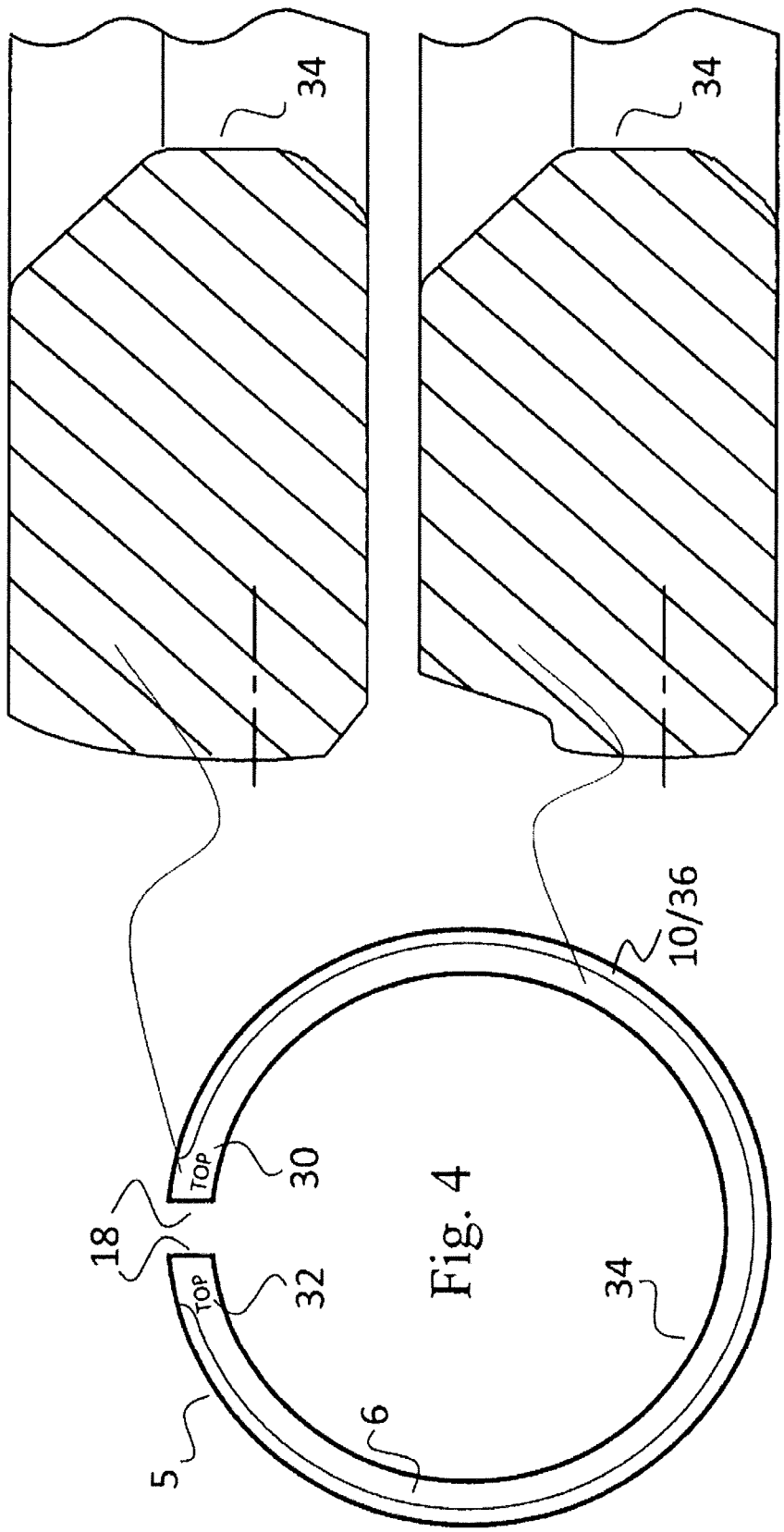

PISTON RING HAVING A STEPPED RUNNING SURFACE

BACKGROUND

1. Technical Field

The present invention relates to a piston ring that is embodied as a stepped ring. The piston ring has a larger diameter on a bottom side that faces away from a combustion chamber than on a top side that faces toward the combustion chamber.

2. Related Art

Oil scraper rings, or nose rings, have long been known that have a notch on an outer lower edge in order to accommodate small amounts of scraped-off oil. These nose rings are primarily used as taper-faced rings in the position of the middle piston ring.

For those piston rings in which the "nose" is disposed on an upper edge of the piston ring the problem has often arisen of excessive contact pressure being generated as a result of combustion gases passing behind the piston ring. Excessive contact pressure can cause increased wear of the piston ring on the contact surface.

SUMMARY

It is therefore desirable to provide a piston ring whose contact pressure is less dependent on the pressure of the combustion gases.

According to one aspect of a present embodiment of the present invention, a stepped piston ring is provided that comprises a contact surface, an upper ring flank, and a lower ring flank, the contact surface having a notch on an upper edge thereof. Combustion gases can penetrate between the piston ring and a cylinder inner wall near the notch. At the same time, combustion fuel gases can pass behind the piston ring through a gap between the upper piston ring flank (on the combustion chamber side) and the upper piston ring groove flank. The combustion gases behind the piston ring press the piston ring more strongly against the inner surface of the cylinder. By their pressure, the fuel gases in the vicinity of the notch exert a force that is directed radially inward. These forces counteract one another. As a result, the ring is to be subjected to a lower load during operation, thereby reducing the wear of the ring.

Preferably, the notch or the step ends short of the respective gap ends in the circumferential direction. An inner bevel or an inner chamfer between the upper ring flank and an inner surface of the piston ring is preferred. A wear protection means on the outside of the ring and/or on the contact surface is preferred. The step is preferably formed by an applied wear protection layer. Preferably, the upper ring flank is provided with a wear protection means and/or the lower ring flank is provided with a wear protection means. Furthermore, the contact surface preferably has a convexity with two equal or different radii of curvature ($R_{bo}$, $R_{bu}$) of between 1 mm and 25 mm, preferably between 5 mm and 20 mm. Furthermore, the notch (10) preferably has a conicity with an angle ($\beta$) of between 0.5° and 5°, preferably 2° and 4°. Finally, the lower edge of the contact surface has an angle ($\delta$) of between 30° and 60° and an axial dimension (Hk) of between 0.03 mm and 0.12 mm.

In one embodiment of the piston ring, the outer surface of the ring forms a step through the notch, with a re-entrant edge and a projecting edge. A flank is formed between the edges. The step is embodied here such that the upper surface of the step is set back in the radial direction relative to the inner surface of the cylinder. The lower surface of the step in the radial direction forms the contact surface, which is intended to be in direct contact with an inner surface of the cylinder and whose largest outer diameter preferably does not come to rest against an edge of the lower surface of the step, but rather in a central region of this step surface. However, it is also conceivable for the largest diameter to rest against the lower edge of the step height. The width of the upper surface of the step is referred to in the following as the step width and extends in the axial direction. The width of the lower surface of the step is referred to below as the step depth. The step height indicates the difference of the radii of the steps. The transition between the upper surface of the step and the lower surface of the step is referred to in the following as the step flank.

In another exemplary embodiment of the present invention, the notch has a radial height (Hr) of at least 0.03 mm. In another exemplary embodiment of the present stepped ring, the step has a flank angle ($\alpha$) of between 10° and 70°, preferably between 20° and 60°, especially preferably between 35° and 55°. The flank angle is determined here relative to a surface that is perpendicular to an axis of symmetry or the axial direction of the piston ring, so that a flank angle of 0° corresponds to a normal step with 90° angles. The flank angle can help improve the machinability of the piston ring. In addition, a relatively large flank angle can positively influence the pressure distribution of the combustion gases. Moreover, a large flank angle can positively influence oil scraping characteristics. What is more, a larger flank angle can reduce a notch effect on the re-entrant edge.

An additional exemplary embodiment of the present stepped ring has a blend radius (Ru) of between 0.05 mm and 0.2 mm at the projecting edge of the step.

Yet another exemplary embodiment of the present stepped ring has a blend radius (Ro) of between 0.05 mm and 0.2 mm at the re-entrant edge of the step.

The rounding at the re-entrant edge contributes substantially to a reduction in notch effects of the piston ring during operation. The rounding and, in particular, the blend radius in combination with the flank angle of the step flank is crucial in determining the oil scraping characteristics or the buoyancy of the piston ring on an existing oil film upon upward movement of the piston.

In another exemplary embodiment of the present invention, the notch or the step ends in the circumferential direction before respective gap ends. The notch ends short of the gap ends in order to reduce blow-by effects through the ring gap. In this embodiment, the step height is reduced to zero before the gap ends in order to prevent the notch from acting like a channel that directs combustion gases toward the gap and contributing to increased blow-by.

In another exemplary embodiment of the present stepped ring, the re-entrant edge extends below half the axial height of the piston ring. The step depth of the lower surface of the step is at least 50% of an overall height of the piston ring, but preferably 5 to 30% of the total height of a piston ring. It is also conceivable, however, to have the edge re-enter above half the axial ring height (about ¾), in which case a step surface of up to 70% is achieved.

An additional exemplary embodiment of the present stepped ring is constructed such that the projecting edge extends below one third of the height of the piston ring in the axial direction. This relatively small axial extension is due to a relatively large axial extension of the transitional portion or of the step flank.

Yet another exemplary embodiment of the present stepped ring further comprises an inner chamfer or an internal angle between the upper ring flank and an inner surface of the piston ring. The notch or the step causes a twisting of the piston ring. This tendency to twist can be counteracted by the corresponding inner chamfer or internal angle.

Preferably, the contact surface of the piston ring is also provided with a wear protection layer.

In another exemplary embodiment of the present invention, the step itself is formed by an applied wear protection layer. Only a lower portion of the contact surface is coated. Since the lower surface of the step is not to be in contact with an inner surface of the piston, costly coating material can be saved here.

In another exemplary embodiment of the present stepped ring, the lower and/or the upper ring flank is provided with a wear protection means. The wear protection can be achieved here through nitration or by means of a wear protection layer that is applied separately.

An additional exemplary embodiment of the present stepped ring is marked on the upper ring edge with the letters "TOP" in order to identify a top surface of the piston ring, and/or it is designated as the upper compression ring by the letters "TOP" on the upper ring flank. The present invention relates to a compression ring that is usually used as an upper or top ring; to ensure that the ring is also inserted into the piston ring groove in the correct orientation, the upper ring edge can also be provided with the designation "Top."

Another exemplary embodiment of the stepped piston ring comprises a contact surface on the lower portion of the outside of the ring, which has a convexity with a radius of curvature of between 1 mm and 25 mm, preferably between 5 mm and 20 mm, and more preferably between 7 and 17 mm. In an additional embodiment, a provision is also made that the lower portion of the outside of the ring that forms a contact surface has two different convexities with two different radii of curvature ($R_{bo}$, $R_{bu}$). Here, radii of curvature of the convexities assume values of between 1 mm and 25 mm, preferably between 8 mm and 20 mm, and more preferably between 7 and 17 mm. A provision is additionally made that, in the case of contact surfaces with two radii of curvature, a lower radius of curvature is at least twice as large as an upper radius of curvature. Furthermore, a provision is made that, in the case of contact surfaces with two radii of curvature, they merge smoothly into one another. In addition, a provision is made that the contact surface is convex and has a largest diameter, with the two radii of curvature of the convexities transitioning into one another at the largest diameter of the contact surface.

According to an additional embodiment of the stepped piston ring, a chamfer is arranged between the lower edge of the contact surface and the lower ring flank which, in the axial direction, has a chamfer height of between 0.02 mm and 0.15 mm, preferably between 0.03 mm and 0.12 mm, and more preferably between 0.04 mm and 0.1 mm, and a chamfer angle ($\delta$) of between 25° and 65°, preferably between 30° and 60°, and more preferably between 35° and 55°. The chamfer serves to scrape off oil and/or to produce a defined oil film upon downward movement of the piston on which this and, optionally, an overlying compression ring can slide.

THE DRAWINGS

In the following, the present invention is illustrated in greater detail with reference to the drawing of schematically illustrated figures.

FIG. 4 shows a plan view of a stepped piston ring according to the invention that illustrates the course of the step in the circumferential direction.

DETAILED DESCRIPTION

Both in the description and in the figures, same or similar reference symbols are used to refer to same or similar elements and components.

Figure 1:
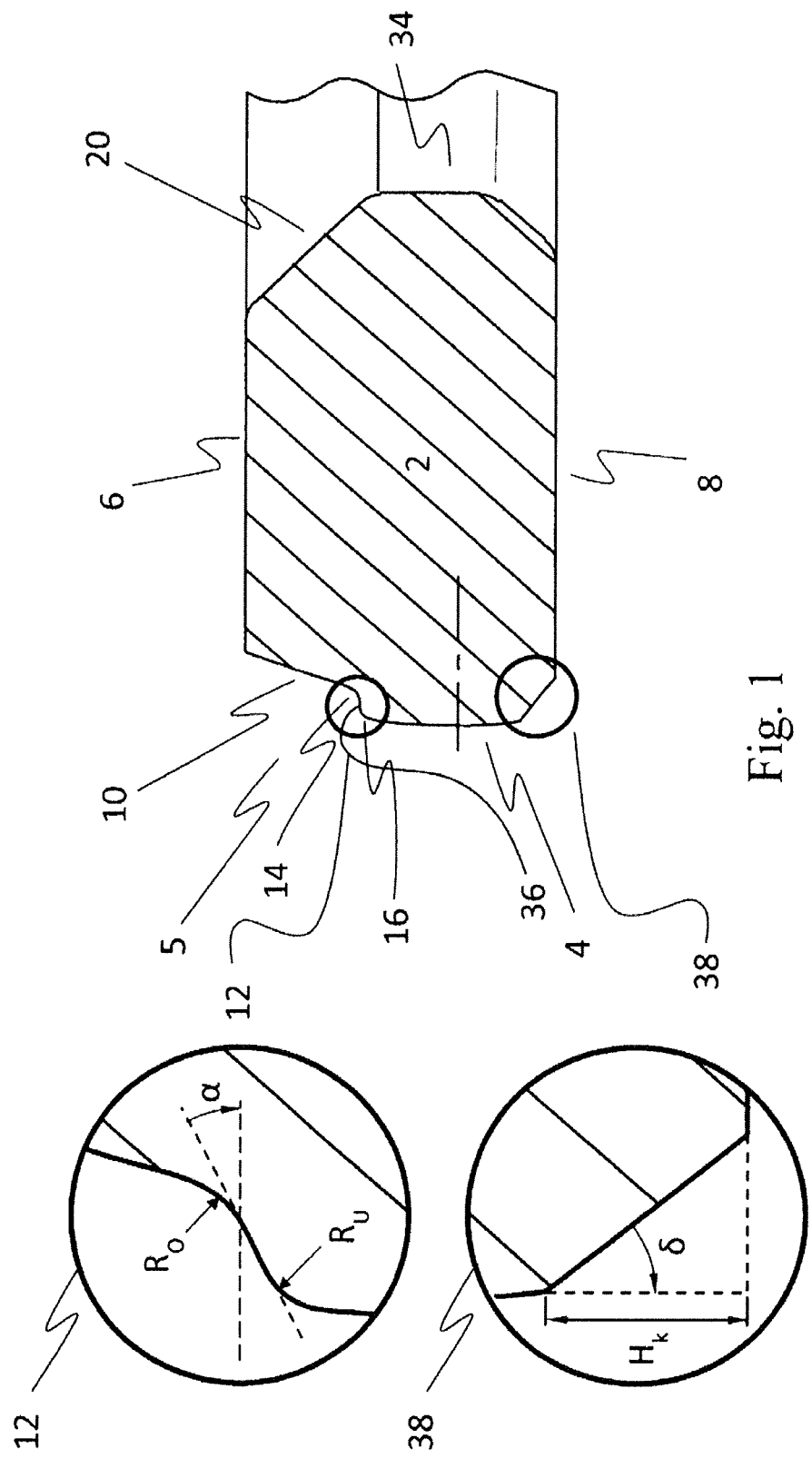
FIGS. 1 to 3 show sectional views and enlarged details of a stepped piston ring according to the invention.

FIG. 1 shows a sectional view through a stepped piston ring 2 according to the invention, with two detailed enlargements of the step regions being shown on the left side. The step piston ring comprises a ring outer surface or outer side 5 of the ring that forms a contact surface 4 in a lower region. In an upper region, the outer side 5 of the ring comprises a notch 10, so that a step 12 is formed between the contact surface 4 and the outer side 5 of the ring. The height of the step is determined by the radial height of the step Hr. Combustion gases can press from the outside through the notch against the piston ring and thus exert a force on the piston ring that counteracts a force generated by combustion gases, which act on an inner surface 34 of the piston ring and press the piston ring against an inner wall of the piston (not shown). The stepped piston ring 2 comprises an upper piston ring flank 6 that faces toward a combustion chamber and a lower piston ring flank 8 that faces away from a combustion chamber. The piston ring is bounded on the inside by an inner surface 34 of the piston ring. The step 12 is shown in the enlargement. The step comprises a projecting edge 16 on the upper side of the contact surface 4. The projecting edge 16 can be rounded with a blend radius Ru. The dimension of the blend radius Ru substantially determines an oil scraping characteristic and/or the characteristic of how easily the piston ring can float on an existing oil film. Another factor that influences the friction and the floating and/or scraping characteristic is the flank steepness or flank slope or the flank angle $\alpha$. The flank angle is measured in an area in which the axial axis of symmetry is located and measured with respect to an area that extends perpendicular to the axial direction. A flank angle of 0° corresponds to a vertical step, and a flank angle of 60° corresponds to a rather gentle transition from the lower step to the contact surface.

The re-entrant edge 14 can be rounded with a blend radius Ro. The dimension of the blend radius Ro substantially determines how strongly the pressure of the combustion gases acts on the lower edge. In the case of a high flank angle, the effect of the combustion gases diminishes slowly from top to bottom.

The lower contact surface chamfer 38 is shown in the lower detailed enlargement. The contact surface chamfer 38 clearly determines an oil scraping characteristic of the piston ring 2 upon downward movement of the piston. The lower contact surface chamfer 38 has an axial height Hk, which should be about 0.08 mm here. Here, the lower contact surface chamfer 38 has a chamfer angle of about 40° relative to the axial direction. The lower contact surface chamfer tends to influence the oil scraping characteristics more readily than a twisting of the piston ring in the piston ring groove.

Figure 2:
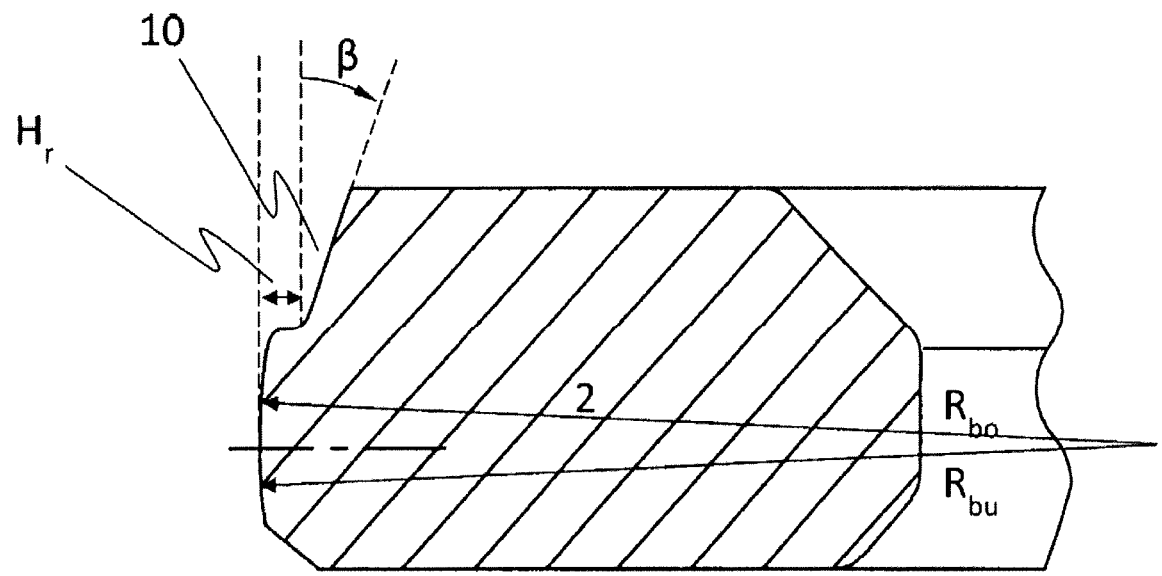

The stepped piston ring 2 shown in FIG. 2 has a convexity of the outer surface 5, more particularly of the outer step surface of the piston ring with two different radii of curvature. The maximum diameter of the piston ring is shown by the dotdashed line. Above the maximum diameter 4, the contact surface has an upper convexity $R_{bo}$ having a radius of curvature that is at least 50% less than a lower convexity $R_{bu}$ of the contact surface 4 below the maximum diameter.

FIG. 2 also shows a notch 10 with the radial step height Hr. A lateral surface of the notch of the stepped piston ring 4 substantially forms a conical surface here (the deviation from the conical surface lies within the measuring and manufacturing tolerances and applies with the exception of the gap ends of the piston ring).

In the embodiment of FIG. 2, the step height or the radial height of the step Hr is determined by the difference of the radii $R_{bo}$ and the radius of the lower frustoconical surface, which defines the lateral surface of the notch 10.

Figure 3:
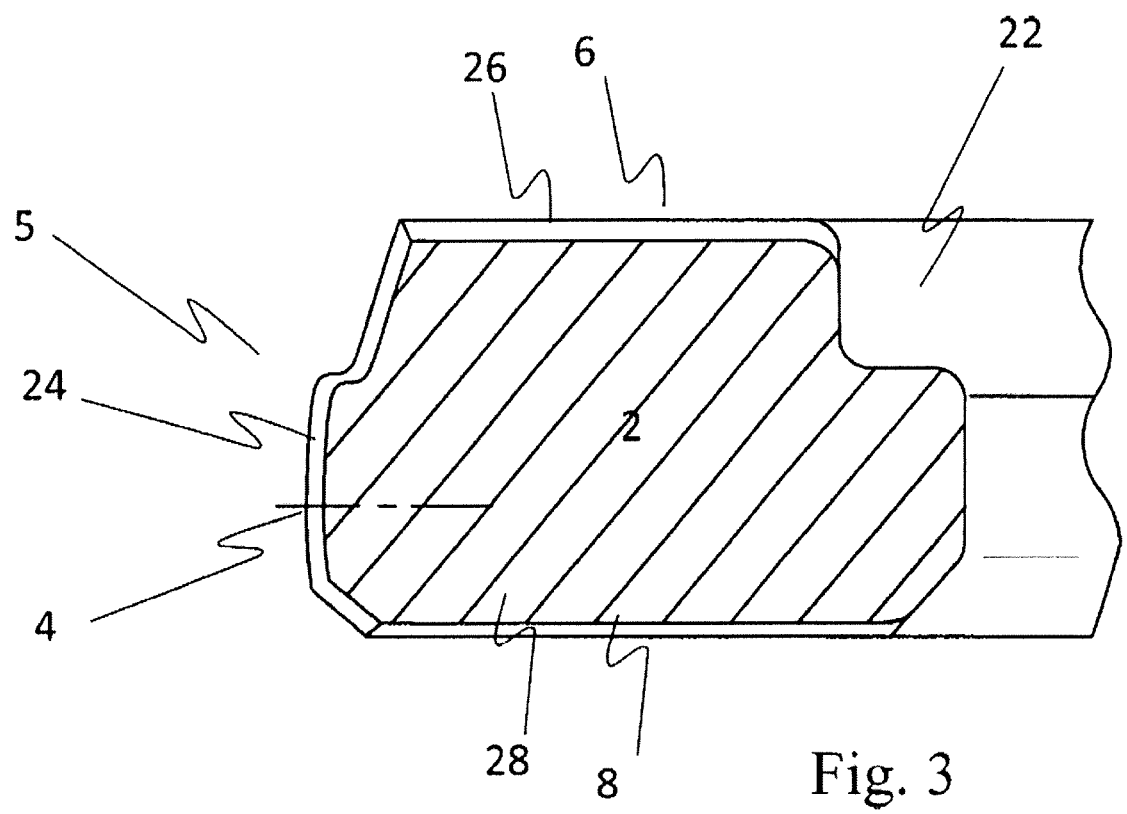

FIG. 3 shows an embodiment of a stepped piston ring in which an outer surface of the ring is protected by an applied wear protection layer 24. In FIG. 3 as well, the contact surface is convex with two different blend radii. Furthermore, instead of the upper inner chamfer, an upper internal angle 22 is provided that influences the twist characteristics of the piston ring.

The upper piston ring flank 6 is provided with an upper wear protection layer 26. The lower piston ring flank 8 is provided with a lower wear protection layer 28.

FIG. 4 shows a plan view of a stepped piston ring according to the invention having a joint region with two gap ends 18, with the notch 10 and hence the visible step flank 36 ending right before the gap ends 18 in each case. The orientation of the piston ring is defined by the designation 32, and "top" designates the upper ring flank 6 that faces toward the combustion chamber. The piston ring is denoted as the upper compression ring or "top ring" by the designation 30 "Top."

It also bears mentioning that the piston ring is preferably embodied as a compression ring or "top ring."

The effects of the notch 10 would be far less evident in a middle piston ring or even in an oil scraping ring, since the compression ring already absorbs the majority of the pressure in the gap between the piston and the cylinder. It is therefore preferred for the middle and lower piston ring as well if the effects of hot combustion gases that press the piston ring outward from the inner surface of the piston ring against an inner surface of the cylinder are also not diminished so effectively.

The invention claimed is:

1. A stepped piston ring, comprising a ring outer side, an upper ring flank, and a lower ring flank, wherein the ring outer side on an upper edge has a notch that is disposed between the ring outer side and the upper ring flank, wherein the notch forms a step that includes a re-entrant edge and a projecting edge on the ring outer side in an axial direction of the ring so that only a lower portion of the ring outer side forms a contact surface, and wherein the stepped piston ring extends in a circumferential direction and includes a ring gap, and wherein the notch extends in the circumferential direction and terminates at each end thereof short of the ring gap; and wherein the notch has a conicity with an angle of between 0.50 to 5° between the re-entrant edge and the upper flank.

2. The stepped piston ring as set forth in claim 1, wherein the notch has a radial height (Hr) of at least 0.03 mm.

3. The stepped piston ring as set forth in claim 1, wherein the step has a flank angle ($\alpha$) of between 10° and 70° with respect to a radial plane.

4. The stepped piston ring of claim 3, wherein the flank angle is between 20° and 60°.

5. The stepped piston ring of claim 3, wherein the flank angle is between 35° and 55°.

6. The stepped piston ring as set forth in claim 1, wherein the projecting edge of the step has a blend radius (Ru) of between 0.05 mm and 0.2 mm.

7. The stepped piston ring as set forth in claim 1, wherein the re-entrant edge of the step has a blend radius (Ro) of between 0.05 mm and 0.2 mm.

8. The stepped piston ring as set forth in claim 1, further comprising an inner chamfer or an internal angle between the upper ring flank and an inner surface of the piston ring.

9. The stepped piston ring as set forth in claim 1, further comprising wear protection on the ring outer side and/or on the contact surface.

10. A stepped piston ring as set forth in claim 9, wherein the wear protection comprises a wear protection layer forming said step.

11. The stepped piston ring as set forth in claim 1, wherein the upper ring flank is provided with wear protection and/or wherein the lower ring flank (8) is provided with wear protection.

12. The stepped piston ring (2) as set forth in claim 1, wherein the contact surface (4) has a convexity with two equal or different radii of curvature ($R_{bo}$, $R_{bu}$) of between 1 mm and 25 mm.

13. The stepped piston ring of claim 12 wherein the two equal or different radii of curvature is between 5 mm and 20 mm.

14. The stepped piston ring (2) as set forth in claim 1, wherein the upper ring flank (6) is marked with the letters "TOP" (30) in order to denote a top side, and/or the piston ring is designated as an upper compression ring by the letters "TOP" (32).

15. The stepped piston ring (2) as set forth in claim 1, wherein the notch (10) has a conicity with an angle ($\beta$) of between 0.5° and 5°.

16. The stepped piston ring as set forth in claim 1, wherein the lower edge of the contact surface has an angle of between 30° and 60° and an axial dimension (Hk) of between 0.03 mm and 0.12 mm.

17. The stepped piston ring as set forth in claim 1 the notch extends over an axial range of 10% to 50% of the total axial height of the piston ring.

18. The stepped piston ring of claim 17, wherein the axial range is between 30% and 50% of the total axial height of the piston ring.

* * * * *